United States Patent
Dai et al.

(10) Patent No.: US 11,719,158 B2
(45) Date of Patent: Aug. 8, 2023

(54) LOW EMISSIONS COMBUSTOR ASSEMBLY FOR GAS TURBINE ENGINE

(71) Applicant: RAYTHEON TECHNOLOGIES CORPORATION, Farmington, CT (US)

(72) Inventors: Zhongtao Dai, West Hartford, CT (US); Lance L. Smith, West Hartford, CT (US); Jeffrey M. Cohen, Hebron, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 81 days.

(21) Appl. No.: 17/189,334

(22) Filed: Mar. 2, 2021

(65) Prior Publication Data

US 2021/0348560 A1    Nov. 11, 2021

Related U.S. Application Data

(63) Continuation of application No. 15/658,464, filed on Jul. 25, 2017, now Pat. No. 10,954,859.

(51) Int. Cl.
*F02C 7/22* (2006.01)
*F02C 3/04* (2006.01)
(Continued)

(52) U.S. Cl.
CPC ............... *F02C 7/222* (2013.01); *F02C 3/04* (2013.01); *F02C 9/26* (2013.01); *F23C 7/004* (2013.01);
(Continued)

(58) Field of Classification Search
CPC .... F02C 7/222; F02C 9/26; F23R 3/14; F23R 3/16; F23R 3/26; F23R 3/28; F23R 3/286
See application file for complete search history.

(56) References Cited

U.S. PATENT DOCUMENTS

| | | | |
|---|---|---|---|
| 3,886,728 A | | 6/1975 | Quinn |
| 4,070,826 A | * | 1/1978 | Stenger ................. F23D 11/106 239/425 |

(Continued)

FOREIGN PATENT DOCUMENTS

| | | |
|---|---|---|
| EP | 2051010 | 4/2009 |
| FR | 2626043 | 7/1989 |
| WO | 2013056819 | 4/2013 |

OTHER PUBLICATIONS

Lee, C-M., Chang, C.T., Herbon, J.T., Kramer, S.K. (2013). NASA project develops next-generation low-amissions combustor technologies. 51st AIAA Aerospace Sciences Meeting, Grapevine, TX. Jan. 7-10, 2013. pp. 1-17.

(Continued)

*Primary Examiner* — Craig Kim
(74) *Attorney, Agent, or Firm* — Carlson, Gaskey & Olds, P.C.

(57) ABSTRACT

A combustor assembly for a gas turbine engine according to an example of the present disclosure includes, among other things, a combustion chamber, and a fuel injector assembly in communication with the combustion chamber that has a swirler body situated about a nozzle to define an injector passage that converges to a throat. The throat is defined at a distance from the combustion chamber. The nozzle includes a primary fuel injector and an array of secondary plain jet fuel injectors.

19 Claims, 7 Drawing Sheets

(51) Int. Cl.

| | |
|---|---|
| *F02C 9/26* | (2006.01) |
| *F23R 3/26* | (2006.01) |
| *F23R 3/28* | (2006.01) |
| *F23D 11/38* | (2006.01) |
| *F23R 3/34* | (2006.01) |
| *F23R 3/14* | (2006.01) |
| *F23C 7/00* | (2006.01) |
| *F02K 3/06* | (2006.01) |

(52) U.S. Cl.
CPC .............. *F23D 11/383* (2013.01); *F23R 3/14* (2013.01); *F23R 3/26* (2013.01); *F23R 3/28* (2013.01); *F23R 3/286* (2013.01); *F23R 3/343* (2013.01); *F23R 3/346* (2013.01); *F02K 3/06* (2013.01); *F05D 2220/32* (2013.01); *F05D 2220/323* (2013.01); *F23D 2202/00* (2013.01); *F23D 2900/00008* (2013.01); *F23D 2900/00015* (2013.01); *F23D 2900/11001* (2013.01); *F23R 2900/03343* (2013.01)

(56) References Cited

U.S. PATENT DOCUMENTS

| | | | | |
|---|---|---|---|---|
| 4,854,127 | A * | 8/1989 | Vinson | ................... F23D 17/00 60/742 |
| 6,345,505 | B1 | 2/2002 | Green | |
| 6,632,084 | B2 | 10/2003 | Berenbrink | |
| 6,935,116 | B2 | 8/2005 | Stuffaford et al. | |
| 7,797,942 | B2 | 9/2010 | Saitoh et al. | |
| 9,068,748 | B2 | 6/2015 | Hoke | |
| 9,400,104 | B2 * | 7/2016 | Low | ....................... F23D 11/383 |
| 9,939,157 | B2 * | 4/2018 | Patel | ....................... F23R 3/286 |
| 2004/0093851 | A1 * | 5/2004 | Dawson | ................... F23R 3/286 60/746 |
| 2006/0042252 | A1 * | 3/2006 | Derouineau | .............. F02C 9/26 60/703 |
| 2007/0089425 | A1 * | 4/2007 | Motter | .................... F23L 7/002 60/39.3 |
| 2011/0089264 | A1 | 4/2011 | Thomson et al. | |
| 2012/0151928 | A1 * | 6/2012 | Patel | ........................ F23R 3/36 60/737 |
| 2012/0151929 | A1 * | 6/2012 | Patel | ........................ F23R 3/60 60/740 |
| 2012/0151930 | A1 | 6/2012 | Patel et al. | |
| 2013/0145765 | A1 * | 6/2013 | Patel | ........................ F23R 3/14 60/737 |
| 2016/0123596 | A1 | 5/2016 | Hoke et al. | |
| 2016/0245523 | A1 | 8/2016 | Kim et al. | |
| 2017/0074518 | A1 * | 3/2017 | Lee | ........................... F23R 3/14 |

OTHER PUBLICATIONS

Greenwood, S. (2000). Low emission combustion technology for stationary gas turbine engines. Proceedings for the 29th Turbomachinary Symposium, pp. 125-136. Retrieved Jul. 25, 2017 from: http://turbolab.tamu.edu/proc/turboproc/T29/.

He, Z.J. (2017). NOx emissions characteristics and correlation equations of two P&W axially staged sector combustors developed under NASA Environmentally Responsible Aviation (ERA) project. NASA/TM-2017-219381. Jan. 2017. pp. 1-9.

Partial European Search Report for European Patent Application No. EP18185531 completed Oct. 25, 2018.

Extended European Search Report for European Patent Application No. 18185531 completed Oct. 25, 2018.

* cited by examiner

LOW EMISSIONS COMBUSTOR ASSEMBLY FOR GAS TURBINE ENGINE

CROSS-REFERENCE TO RELATED APPLICATIONS

This application is a continuation of U.S. patent application Ser. No. 15/658,464, filed Jul. 25, 2017.

STATEMENT REGARDING FEDERALLY SPONSORED RESEARCH OR DEVELOPMENT

This invention was made with government support under Contract No. NNC14CA30C, awarded by the United States National Aeronautics and Space Administration (NASA). The Government has certain rights in this invention.

BACKGROUND

This application relates to combustor arrangements for a gas turbine engine, including combustors having low nitrogen oxide (NOx) and soot emissions.

Gas turbine engines are known, and typically include a fan delivering air into a low pressure compressor section. The air is compressed in the low pressure compressor section, and passed into a high pressure compressor section. From the high pressure compressor section the air is introduced into a combustor section where it is mixed with fuel and ignited. Products of this combustion pass downstream over a high pressure turbine section, and then a low pressure turbine section to extract energy for driving the fan.

Some combustor sections have a pilot injector and a main injector that introduce fuel into a combustion chamber where the fuel is burned. The pilot injector typically causes a relatively hot, stable, non-premixed-type pilot flame to be produced for igniting a fuel stream injected into the combustion chamber by the main injector to produce a main flame. The non-premixed flame can be associated with relatively high NOx emissions and levels of soot.

SUMMARY

A combustor assembly for a gas turbine engine according to an example of the present disclosure includes a combustion chamber, and a fuel injector assembly in communication with the combustion chamber that has a swirler body situated about a nozzle to define an injector passage that converges to a throat. The throat is defined at a distance from the combustion chamber. The nozzle includes a primary fuel injector along a first fuel injector axis and at least one secondary plain jet fuel injector axially forward of the primary fuel injector.

In a further embodiment of any of the foregoing embodiments, the injector passage includes a first passage section merging into a second passage section. The first passage section is defined between the swirler body and the nozzle, and the second passage section defines the throat.

In a further embodiment of any of the foregoing embodiments, a radially outer wall of the first passage section slopes toward the first fuel injector axis to define a first passage angle. The first passage angle is between about 30 degrees and about 50 degrees.

In a further embodiment of any of the foregoing embodiments, a radially inner wall of the first passage section slopes toward the first fuel injector axis to define a second passage angle. The second passage angle is within about 5 degrees of the first passage angle.

In a further embodiment of any of the foregoing embodiments, the injector passage defines a first passage area with respect to a first reference plane that is perpendicular to the first fuel injector axis and intersects an outlet of the at least one secondary plain-jet fuel injector. The injector passage defines a second passage area with respect to a second reference plane along the throat that is perpendicular to the first fuel injector axis, and a ratio of the first passage area to the second passage area being about 1.2 to about 1.5.

In a further embodiment of any of the foregoing embodiments, the injector passage diverges aft of the throat with respect to the first fuel injector axis.

In a further embodiment of any of the foregoing embodiments, an outlet of the at least one secondary plain-jet fuel injector and the throat define a first distance with respect to the first fuel injector axis, an outlet of the primary fuel injector and the throat defines a second distance with respect to the first fuel injector axis, and a ratio of the first distance to the second distance being between about 2.0 to about 4.0.

In a further embodiment of any of the foregoing embodiments, the at least one secondary plain jet defines a second fuel injector axis. The at least one secondary plain-jet fuel injector is arranged such that a projection of the second fuel injector axis intersects an outer wall of the injector passage.

In a further embodiment of any of the foregoing embodiments, the primary fuel injector is arranged to generate a non-premixed fuel stream, and the at least one secondary plain-jet fuel injector is arranged to generate a substantially premixed fuel stream.

A further embodiment of any of the foregoing embodiments includes a control that meters flow of fuel to the primary fuel injector and flow of fuel to the at least one secondary plain-jet fuel injector in a first mode, and meters flow of fuel to the primary fuel injector and to the at least one secondary plain-jet fuel injector in a second, different mode such that a rate of the flow of fuel to the primary fuel injector and the at least one secondary plain-jet fuel injector differs from the first mode.

A gas turbine engine according to an example of the present disclosure includes a fan section that has a plurality of fan blades rotatable about an engine axis, a compressor section in fluid communication with the fan section, a turbine section that drives the fan section, and a combustor section in fluid communication with the compressor section and the turbine section. The combustor section has a combustion chamber that extends from a bulkhead, and a fuel injector assembly along the bulkhead. The fuel injector assembly has a nozzle that extends along a nozzle axis and a swirler body. The nozzle has a primary fuel injector along the nozzle axis and an array of secondary plain-jet fuel injectors arranged about a periphery of the nozzle. The swirler body is situated about the nozzle to define an injector passage that converges to a throat such that flow through the injector passage accelerates towards the throat.

In a further embodiment of any of the foregoing embodiments, the throat is defined at a position axially forward of the combustion chamber relative to the nozzle axis.

In a further embodiment of any of the foregoing embodiments, the injector passage includes a first passage section merging into a second passage section. The first passage section is an annulus defined between the swirler body and the nozzle. The first passage section extends from an array of vanes that provide airflow to the first passage section, and the second passage section defines the throat at a position axially aft of the primary fuel injector relative to the nozzle axis.

A further embodiment of any of the foregoing embodiments includes a controller that meters flow of fuel to the primary fuel injector and flow of fuel to the array of secondary plain-jet fuel injector in a first operating condition of the engine, and meters flow of fuel to the primary fuel injector and to the array of secondary plain-jet fuel injectors in a second, different operating condition of the engine such that a rate of the flow of fuel to the primary fuel injector and the array of secondary plain-jet fuel injectors differs from the first operating condition.

A further embodiment of any of the foregoing embodiments includes a main fuel injector radially disposed about the combustion chamber at a location axially aft of the bulkhead. The controller permits flow to the main fuel injector in the second operating condition but not the first operating condition. The first operating condition is a low power operating condition of the engine, and the second operating condition is a relatively higher power operating condition of the engine.

A method of operating a combustor assembly for a gas turbine engine according to an example of the present disclosure includes accelerating airflow in an injector passage from a first passage section toward a throat defined by a second passage section, injecting fuel into the first passage section and fuel into the second passage section to establish a single non-premixed flame during a first, different mode, and injecting fuel into the first passage section to establish a non-premixed flame and fuel into the second passage section to establish a premixed flame during a second mode.

A further embodiment of any of the foregoing embodiments includes injecting fuel into a combustion chamber at a location downstream of the injector passage to establish a main flame during the second mode, but not the first mode.

In a further embodiment of any of the foregoing embodiments, the first mode corresponds to low power operating condition of the engine, and the second mode corresponds to higher power operating condition of the engine.

In a further embodiment of any of the foregoing embodiments, the first passage section defines a first passage area. The second passage section defines a second passage area at the throat, and a ratio of the first passage area to the second passage area being about 1.2 to about 1.5.

In a further embodiment of any of the foregoing embodiments, the second passage section diverges between the throat and a combustion chamber at a location downstream of the injector passage.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
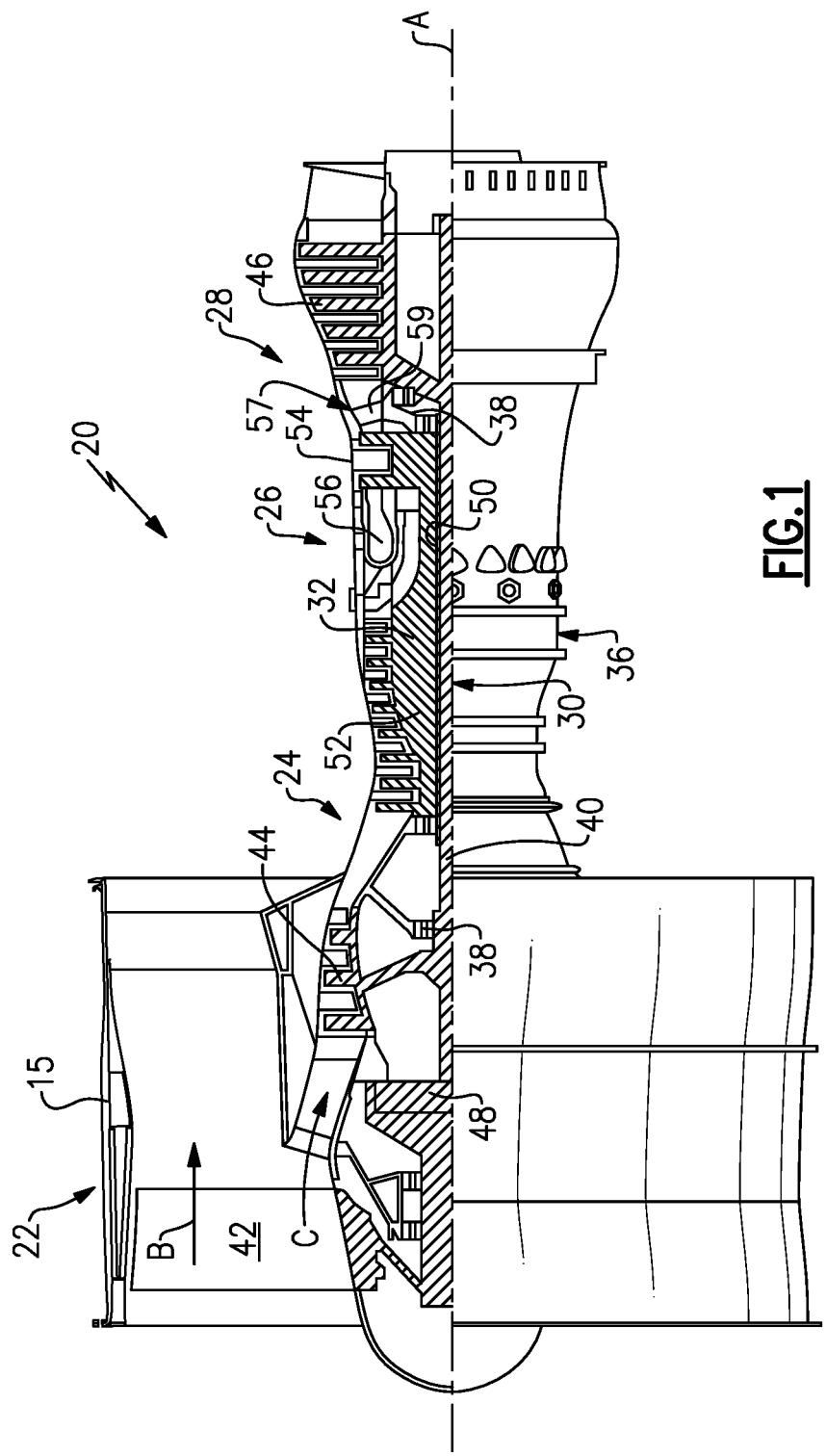
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
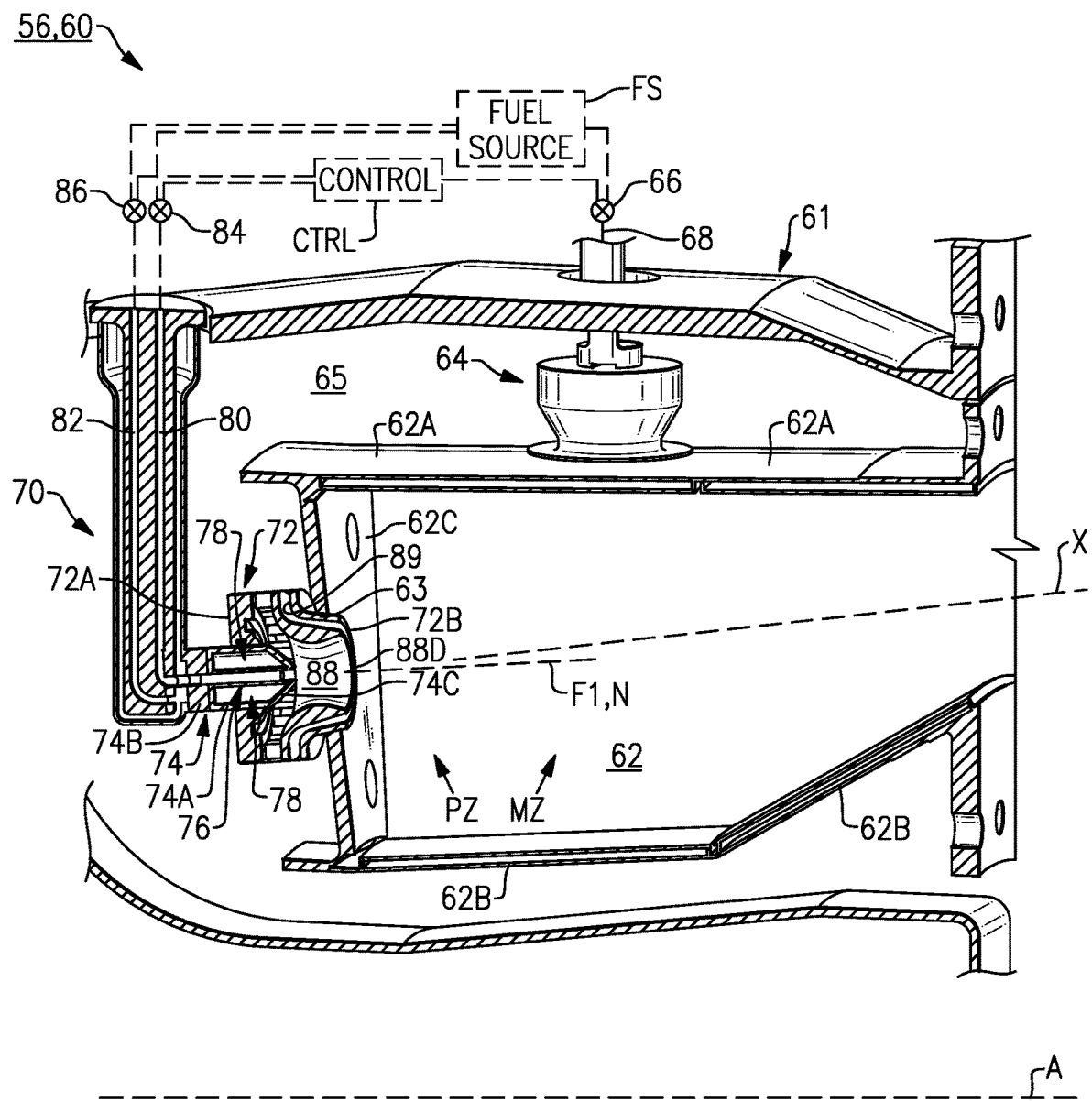
FIG. 2 illustrates a perspective view of an example combustor assembly.

FIG. 2 illustrates a cross-sectional view of a combustor assembly 60 for combustion of fuel within a combustion chamber 62. The combustor assembly 60 can be utilized in the combustor 56 of engine 20, with products of combustion delivered to the turbine section 28, for example. Although the combustor assembly 60 is primarily discussed with respect to a turbofan gas turbine engine such as engine 20, other systems may also benefit from the teachings herein, including land-based and marine-based gas turbine engines.

The combustor assembly 60 includes a housing 61 supporting one or more radially outer (or first) panels 62A and one or more radially inner (or second) panels 62B. The panels 62A, 62B extend in an aft direction from a generally radially extending bulkhead 62C with respect to a combustor cross sectional centerline axis X to define the combustion chamber 62. The combustor axis X can be substantially co-linear with, or transverse to, the engine longitudinal axis A (FIG. 1). The panels 62A, 62B and bulkhead 62C can include liners that substantially thermally isolate the combustion chamber 62 from a chamber 65 and other adjacent portions of the combustor 56 (FIG. 1). The chamber 65 can receive pressurized, relatively cool airflow from an upstream portion of the engine 20, for example, that can be utilized in the combustion process.

The combustor 56 can include a plurality of combustor assemblies 60 disposed in an array about the combustor axis X, each associated with a respective combustion chamber 62 that can have a substantially cylindrical profile, for example. In other examples, the combustion chamber 62 is an annulus swept about the combustor axis X and is in fluid communication with an array of combustor assemblies 60 circumferentially distributed about the combustor axis X.

The combustor assembly 60 can include one or more main fuel injector assemblies 64 in communication with a main zone MZ of the combustion chamber 62 and one or more pilot fuel injector assemblies 70 in communication with a pilot zone PZ of the combustion chamber 62 generally upstream of the main zone MZ. The main fuel injector assembly 64 can be operable to cause a main, substantially premixed flame to be produced for relatively high power conditions, and the pilot fuel injector assembly 70 can be operable to cause a pilot flame to be produced to provide energy during relatively low power conditions, and ignition and stability of the main flame during high power operations. Example high power (or second) conditions may include a late acceleration, takeoff, climb or cruise operating condition of the engine 20. Example low power (or first) conditions may include ground idle, idle (taxiing), initial acceleration, flight idle and approach operating condition of the engine 20. The pilot flame can be relatively smaller during high power conditions as compared to low power conditions of the engine 20, taking less than 25% of total fuel, for example.

The main fuel injector assembly 64 can be coupled to a main fuel line 68, which may be metered by a main valve 66. The main valve 66 can be coupled to a fuel source FS. The main valve 66 can be coupled to a control CTRL operable to modulate the main valve 66 to deliver a desired amount of fuel from the fuel source FS through the main fuel line 68 during different operating modes of the combustion assembly 60 or operating conditions of the engine 20.

The main fuel injector assembly 64 can include one or more injectors which cause fuel from the main fuel line 68 to be injected into the combustion chamber 62 in a generally radial direction to cause a main flame to be generated. The main fuel injector assembly 64 can include a mixer that substantially mixes fuel from the main fuel line 68 with air to produce a premixed flame in the combustion chamber 62. The premixed flame may correspond to a flame having relatively low NOx and soot emissions. For the purposes of this disclosure, the term "premixed" refers to a fuel/air mixture stream comprising fuel and air that is substantially mixed prior to being burned, and the term "non-premixed" refers to fuel which is mixed with air while being burned.

Figure 3:
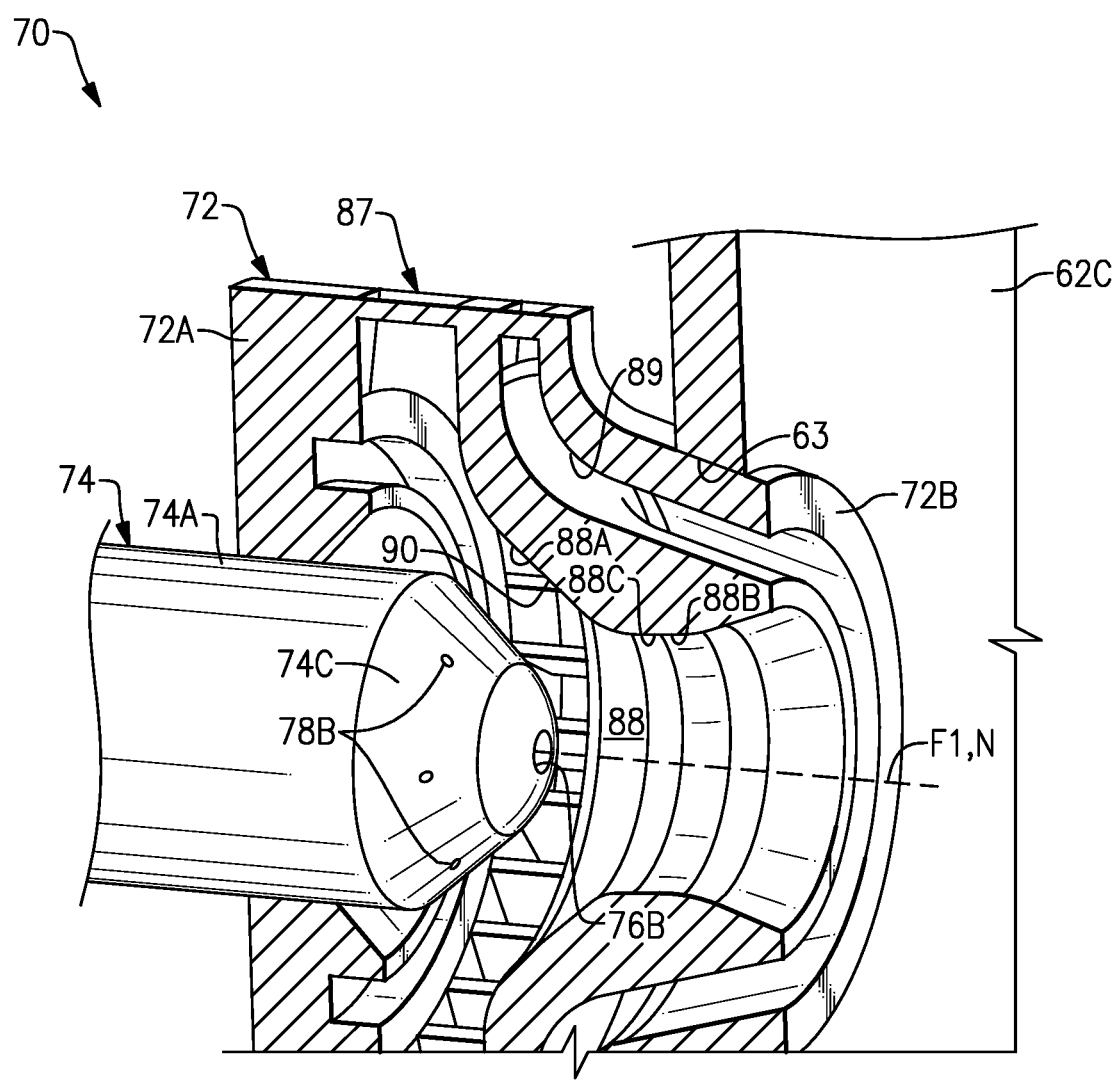
FIG. 3 illustrates a perspective view of an example pilot fuel injector assembly that can be utilized with the combustor assembly of FIG. 2.
Figure 4:
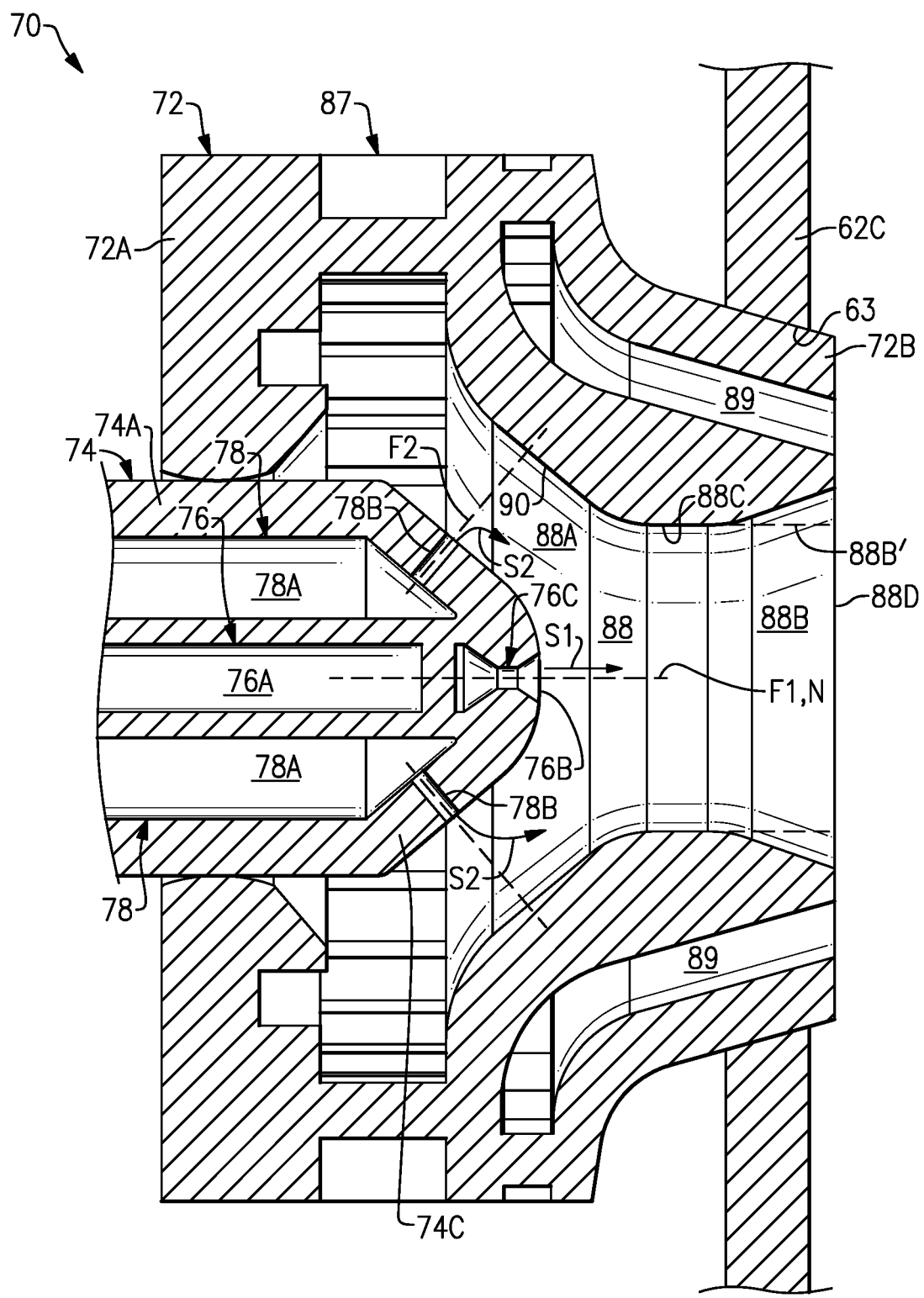
FIG. 4 illustrates a cross-sectional view of the pilot fuel injector assembly of FIG. 3.

Referring to FIGS. 3 and 4, with continued reference to FIG. 2, the pilot fuel injector assembly 70 includes a housing or swirler body 72 that is disposed about a nozzle 74, with the housing or swirler body 72 and the nozzle 74 being distinct and separable components. In alternative examples, the nozzle 74 and at least portions of the housing or swirler body 72 are integrally formed. The swirler body 72 can be situated relative to an opening or aperture 63 defined by the bulkhead 62C, with the swirler body 72 and the bulkhead 62C being distinct and separable components. In alternative examples, the bulkhead 62C and at least portions of the swirler body 72 are integrally formed. The swirler body 72 extends between a first end portion 72A and a second end portion 72B. The first end portion 72A extends about at least a portion of the nozzle 74. The second end portion 72B can extend aftwards through at least a portion of the bulkhead 62C and into the combustion chamber 62.

The nozzle 74 includes a nozzle body 74A that extends along a nozzle longitudinal axis N between a first end portion 74B and a second end portion 74C. The nozzle longitudinal axis N can be substantially parallel to the combustor axis X, for example, and the combustor axis X can be parallel or have an angle (pitch angle) to the engine axis A. The nozzle body 74A can have a generally cylindrical profile, for example, with the nozzle body 74A tapering at the second end portion 74C to have a substantially rounded or dome shaped profile.

The nozzle 74 is situated relative to the swirler body 72 to define a first (or radially inner) injector passage 88 for delivering airflow and fuel downstream toward the combustion chamber 62. The swirler body 72 can define a second (or radially outer) injector passage 89 radially disposed about at least a portion of the first injector passage 88 for delivering airflow to the combustion chamber 62. Each of the injector passages 88, 89 receive airflow from the chamber 65 which can vary during different operating conditions or engine cycles of the engine 20 (e.g., decrease during low power conditions and increase during high power conditions).

The second injector passage 89 can be in the shape of an annulus that tapers in the aft direction, for example. In some examples, between about 50-95 percent of the total airflow to the pilot fuel injector assembly 70 is communicated to the first injector passage 88 at a relatively lower swirl number, and between about 5-50 percent of the total airflow is communicated to the second injector passage 89 at a relatively higher swirl number. In one example, about 85 percent of the airflow is delivered by the first injector passage 88, and about 15 percent of the total airflow is delivered by the second injector passage 89. Airflow from the second injector passage 89 can be directed toward the radially-most corners of the combustion chamber 62 adjacent the bulkhead 62C to improve the combustion process.

The pilot fuel injector assembly 70 includes at least one primary fuel injector 76 and one or more secondary fuel injectors 78. In one example, the pilot fuel injector assembly 70 includes one primary pressure swirl fuel injector 76 and an array of six secondary plain-jet fuel injectors 78 arranged about a periphery of the nozzle 74. The primary fuel injector 76 extends along a first fuel injector axis F1 that can be collinear with the nozzle longitudinal axis N of the nozzle 74 such that the primary fuel injector 76 is situated at a terminal end of the second end portion 74C of the nozzle 74. In other examples, the first fuel injector axis F1 is offset from, or transverse to, the nozzle longitudinal axis N. In the illustrated example, the primary fuel injector 76 ejects a primary (or first) fuel stream S1 (FIG. 4) toward the combustion chamber 62 in a generally cone shape having an axis of the cone along the nozzle longitudinal axis N. The primary fuel stream S1 cone angle is generally the same as an exit angle (i.e., prefilmer angle) of outlet 76B of primary fuel injector 76 for improving fuel atomization and distribution in the non-pre-mixed pilot flame.

The primary fuel injector 76 can be a fluid communication with a primary fuel line 80, and each secondary plain-jet fuel injectors 78 can be coupled to a secondary fuel line 82 (FIG. 2). The primary fuel line 80 can be coupled to primary valve 84, and the secondary fuel line 82 can be coupled to a secondary valve 86 (FIG. 2). The valves 84, 86 can be coupled to control CTRL (FIG. 2), which can be configured to cause fuel source FS (FIG. 2) to deliver a desired amount of fuel to the respective fuel injectors 76, 78. In the illustrated example, the primary fuel line 80 delivers fuel to the primary fuel injector 76, and the secondary fuel line 82 delivers fuel to the secondary plain-jet fuel injectors 78. In some examples, the fuel split between primary and secondary fuel lines 80, 82 of the pilot injector are pre-determined for all power operations based on the total pilot injector assembly 70 fuel flow rate or fuel pressure to reduce the complexity of combustor fuel control system.

Referring to FIG. 4, the primary fuel injector 76 includes a passage 76A that receives fuel from the primary fuel line 80 (FIG. 2) for injection through an outlet 76B. The outlet 76B can be coupled to a spin chamber or swirler 76C for improving the atomization quality of non-premixed fuel from the passage 76A. Each secondary plain-jet fuel injectors 78 includes a passage 78A that receives fuel from the secondary fuel line 82 (FIG. 2), and ejects a secondary (or second) fuel stream S2 from an outlet 78B. In the illustrated example, one or more of the outlets 78B of the secondary plain-jet fuel injectors 78 is forward of the outlet 76B of the primary fuel injector 76 with respect to the combustor axis X, or is otherwise upstream of the outlet 76B with respect to a general direction of flow through the injector passage 88.

The swirler body 72 is situated about the nozzle 74 to define a first passage section 88A and a second passage section 88B of the injector passage 88. The first passage section 88A extends from an array of vanes 87 that provide a desired amount of airflow to the first passage section 88A which can vary during different operating conditions of the engine. The outer wall 90 of the swirler body 72 is contoured such that the first passage section 88A is the shape of an inward sloping annulus that extends about the nozzle body 74A and merges into the second passage section 88B. The contoured, dome-shaped profile of the second end portion 74C of the nozzle body 74A can reduce a likelihood of low streamwise velocity in the injector passage 88 upstream of the primary fuel injector 76, thereby reducing the risk of flame holding, auto-ignition and flashback.

The first passage section 88A converges in the aft direction with respect to the nozzle longitudinal axis N to define a throat 88C. For the purposes of this disclosure, the throat is defined as the minimum effective cross-sectional area of the injector passage 88 between an outlet 78B of the forwardmost one of the secondary plain-jet fuel injectors 78 and a passage outlet 88D defined at the aftmost most portion of the injector passage 88 with respect to the nozzle longitudinal axis N. The throat 88C is defined at a position axially forward of, and at a distance from, the passage outlet 88D and the combustion chamber 62 relative to the nozzle longitudinal axis N.

In the illustrated example, the injector passage 88 has a convergent-divergent profile such that the second passage section 88B diverges along locations aft of the throat 88C, with the effective cross-sectional area of the injector passage 88 increasing at positions downstream of the throat 88C. In alternative examples, the injector passage 88 has a convergent-straight profile such that the second passage section 88B has substantially the same cross-sectional area between the throat 88C and the passage outlet 88D of the injector passage 88 (depicted by 88B' in FIGS. 4 and 5). The convergent-divergent or convergent-straight profile narrows the cross sectional area of passage section 88A, which can significantly increase the air velocity impacting fuel streams S1 and S2 to improve atomization quality.

Each of the secondary plain-jet fuel injectors 78 has a passage that defines a second fuel injector axis F2 extending through the outlet 78B. Each of the secondary plain-jet fuel injectors 78 can be arranged such that a projection of the respective second fuel injector axis F2 intersects the outer wall 90 of the injector passage 88 along the first passage section 88A. The secondary fuel injectors 88 are arranged such that the secondary fuel stream S2 ejected from the outlet 78B is carried by airflow through the first passage section 88A toward the throat 88C. The entire secondary fuel stream S2 may be carried by airflow toward the throat 88C without contacting the outer wall 90, or a portion of the secondary fuel stream S2 may contact the outer wall 90 on its way toward the throat 88C.

Figure 5:
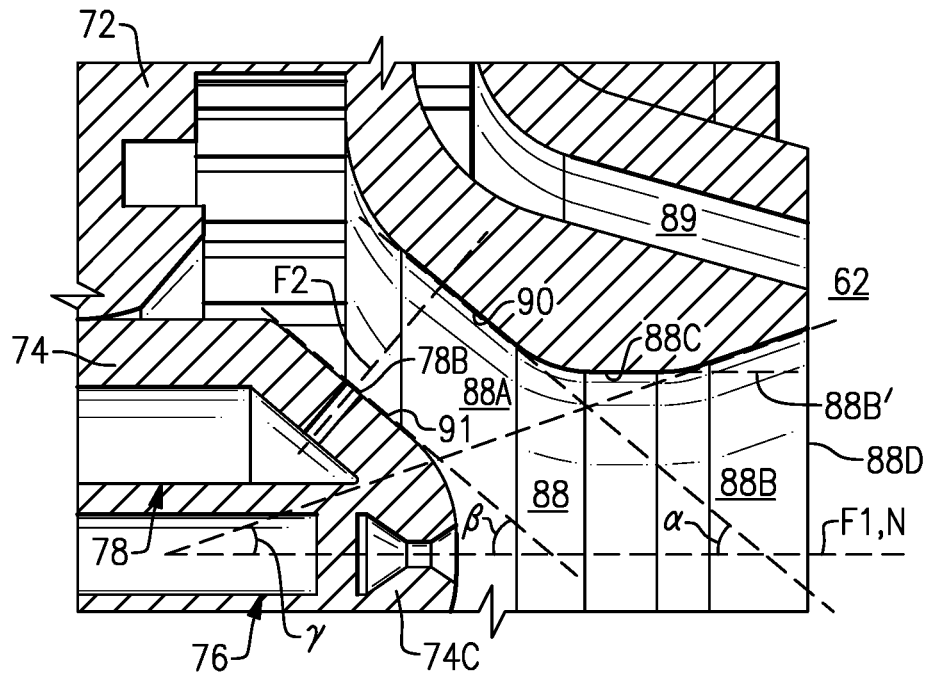
FIG. 5 shows a cross-sectional view of selected portions of the pilot fuel injector assembly of FIG. 4 illustrating various dimensional relationships.

Referring to FIG. 5, a localized region of the outer wall 90 of the first passage section 88A, which intersects the projection of the second fuel injector axis F2, slopes towards the first fuel injector axis F1 to define a first passage angle α. A localized region of radially inner wall 91 of the nozzle 76 defining the first passage section 88A, which intersects the second fuel injector axis F2, slopes toward the first fuel injector axis F1 to define a second passage angle β. The first and/or second passage angles α, β can be between about 30-50 degrees, for example. In some examples, the first and/or second passage angles α, β are between about 40-45 degrees. The second passage angle β can be within about ±5 degrees of the first passage angle α such that the radially outer and inner walls 90, 91 are substantially parallel to each other along a length of the first passage section 88A.

The passage angles α, β can be defined such that the first passage section 88A converges toward the throat 88C, thereby accelerating a velocity of flow towards the throat 88C. The increased velocity improves the atomization quality of the fuel streams S1, S2, including high power conditions. At low power conditions, the spray droplets from both fuel streams S1, S2 can be relatively large and vaporization rate can be relatively insignificant because of relatively low air velocity and temperature. Furthermore, at low power as much as 100 percent of the total combustor fuel is injected through the pilot injector assembly 70, so that most of the fuel from fuel streams S1, S2 is able to reach the outer wall 90 and form a fuel film on the throat 88C and/or divergent portion of the second passage section 88B to produce a single surface film. The single surface film is atomized by air flow from both injector passages 88, 89 and is ignited to produce a single, relatively high temperature non-premixed pilot flame to provide improved ignition/relight capability, lean blowout, and efficiency, for example, during low power operation. During high power conditions, the velocity or momentum of airflow through the injector passage 88 can significantly increase, which can not only significantly improve atomization quality, e.g., relatively much smaller droplets, but can also reduce fuel stream penetration and reduces a likelihood of a surface film being generated on surfaces of the injector passage 88. In some examples, for the staged combustor system (FIG. 7) shown for example by combustor assembly 60 having both main and pilot fuel injector assemblies 64, 70, less than about 25 percent of total combustor fuel is injected through the pilot injector assembly 70 during high power operation such that the fuel stream S2 stays in roughly the middle of injector passage 88 to help achieve uniform mixing of fuel and air. Improved atomization plus increased air temperature at high power can enhance fuel vaporization to improve the degree of premixing. Improved atomization, optimized fuel penetration and enhanced fuel vaporization can assist in making fuel stream S2 achieve an improved degree of premixing to form a substantially premixed flame. Fuel stream S1 is less perfectly mixed with air, and is ignited to form a stable non-premixed flame during high power operation. The spray angle of the outlet 76B of the primary fuel injector 76 can also be defined to maximize the stability of the non-premixed flame where fuel stream S1 is burned. This stable non-premixed flame may help to suppress or substantially reduce possible combustion acoustics.

A localized region of the radially outer wall 90 along the second passage section 88B can diverge aft of the throat 88C to establish a third passage angle γ relative to the first injector axis F1. The third passage angle γ can be less than or equal to about 20 degrees, or more narrowly between about 5-15 degrees, for example. For the purposes of this disclosure, the term "about" means±3 percent of the stated value unless otherwise disclosed. In some examples, the passage angles α, β and/or γ are defined with respect to the nozzle longitudinal axis N. The divergent arrangement of the second passage section 88B can significantly anchor and assist in stabilizing the pilot flame, which can assist in reducing or substantially preventing combustion acoustics.

Figure 6:
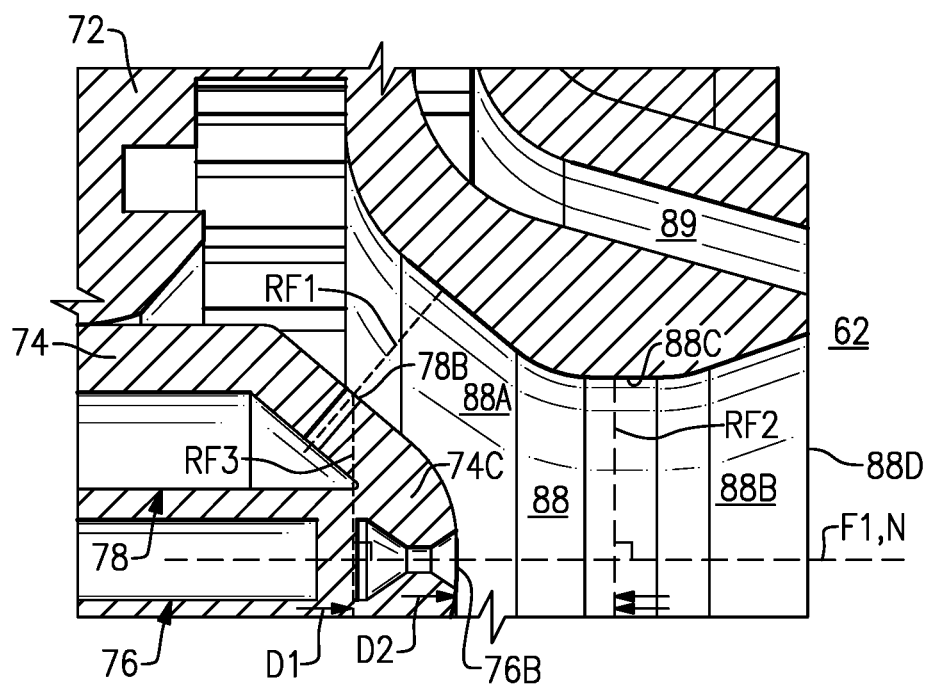
FIG. 6 illustrates a cross-sectional view of selected portions of the pilot fuel injector assembly of FIG. 4 illustrating other various dimensional relationships.

Referring to FIG. 6, the first passage section 88A of the injector passage 88 defines a first passage area A1 with respect to a first reference plane RF1 swept about the first fuel injector axis F1 to have substantially annular geometry. The first reference plane RF1 extends along the second fuel injector axis F2 and intersects inner and outer walls 90, 91. The second passage section 88B of the injector passage 88 defines a second passage area A2 with respect to a second reference plane RF2 along the throat 88C that is perpendicular to the first fuel injector axis F1. In some examples, a ratio of the first passage area A1 to the second passage area A2 is between about 1.1-2.0, or more narrowly between about 1.2-1.5, for example, for improving atomization of the secondary fuel stream S2 ejected by the secondary plain-jet fuel injectors 78 and for reducing a likelihood of auto-ignition, flame holding and flashback of the secondary fuel stream S2 in the first passage section 88A. In some examples, the first and/or second reference planes RF1, RF2 are defined with respect to the nozzle longitudinal axis N.

The relative positions of the outlets 76B, 78B of the fuel injector 76 and plain-jet fuel injectors 78 can be arranged relative to each other and/or the throat 88C to provide a desired amount of premixing of fuel and air in the injector passage 88. For example, a third reference plane RF3 extends perpendicular from the first fuel injector axis F1 and intersects the first reference plane RF1 at the outlet 78B of the forwardmost one of the secondary plain-jet fuel injectors 78. The throat 88C and a projection of the outlet 78B of the forwardmost one of the secondary plain-jet fuel injectors 78 along the third reference plane RF3 define a first distance D1 with respect to the first fuel injector axis F1. The outlet 78B of the primary fuel injector 76 and the throat 88C define a second distance D2 with respect to the first fuel injector axis F1. A ratio of the first distance D1 to the second distance D2 can be between about 1.5-4.5, or more narrowly between about 2.0-4.0, for example, to reduce a likelihood of auto-ignition of the secondary fuel stream S2 in the first passage section 88A. In some examples, the first and/or second distances D1, D2 are defined with respect to the nozzle longitudinal axis N.

In some examples, the controller CTRL is operable to independently meter flow of fuel through the primary and secondary fuel lines 80, 82. For example, the controller CTRL is operable to meter flow of fuel through the primary and secondary fuel lines 80, 82 in a first mode, and is operable in a second, different mode, such that a flow rate through each of the fuel lines 80, 82 differs from the first mode. In other examples, a fuel split between primary and secondary fuel lines 80, 82 is pre-determined for delivering fuel to the pilot fuel injector 70 as a function of power conditions that can be established in order to reduce the complexity of the controller CTRL. The fuel split can be linked to (or dependent upon) the total fuel flow or pressure through the pilot fuel injector assembly 70 to provide passive control. Fuel flow through the primary fuel line 80 can be about 50 percent of the total fuel flow to the pilot fuel injector assembly 70 during low power operation, for example. In one example, the fuel flow through the primary fuel line 80 is about 35 percent of the total fuel flow to the pilot injector assembly 70 during high power operation.

Figure 7:
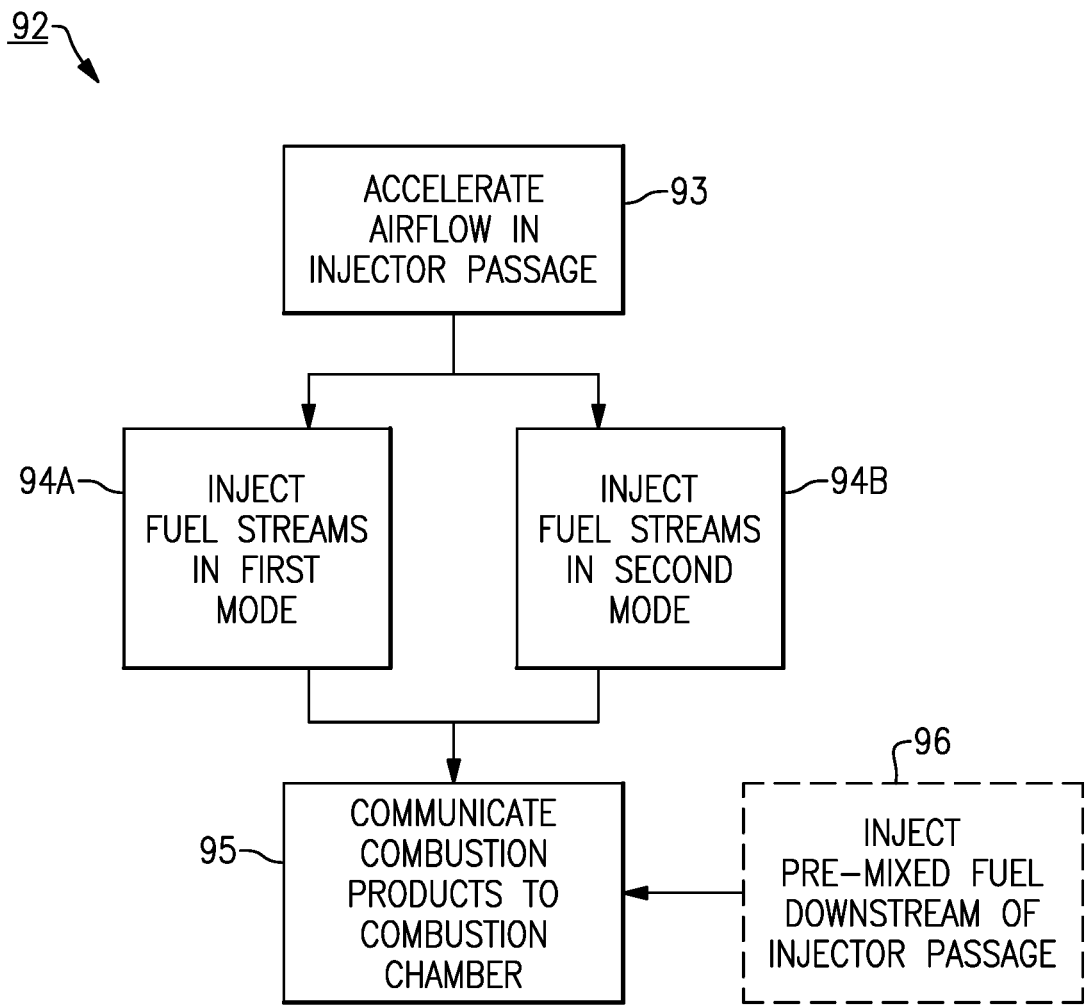
FIG. 7 illustrates a process for operating a combustor assembly.

FIG. 7 illustrates a process for operating a combustor assembly in a flowchart 92, such as the combustor assembly 60 of FIGS. 2-6. At block 93, airflow is accelerated in injector passage 88 from the first passage section 88A toward throat 88C. At block 94A, during a first (or non-staged) mode for low power operation, substantially all or 100 percent of total fuel is injected through the pilot injector. The fuel streams S1, S2 are injected into the injector passages 88A, 88B to establish a relatively stable high temperature single non-premixed flame. At block 94B, during a second (or staged) mode, a lesser percentage (e.g., 25 percent) of the total fuel injected through the pilot injector assembly 70. The fuel stream S1 is injected by the primary fuel injector 76 into the second passage section 88B to establish a non-premixed flame, and fuel stream(s) S2 are injected by secondary plain-jet fuel injector(s) 78 into the first injector passage 88A to establish a premixed flame. The remainder of the fuel is injected through the main fuel injector assembly 64, generally downstream of the pilot fuel injector assembly 70, to form a relatively large premixed main flame. In some examples, the first mode corresponds to idle, initial acceleration, approach and flight idle, and the second mode corresponds to late acceleration, takeoff, climb and cruise operating condition of the engine 20.

In examples, a rate of flow of fuel to the primary fuel injector 76 and the secondary plain-jet fuel injector(s) 78 and/or airflow through the injector passage 88 during the first mode or operating condition differs from the second mode or operating condition. In other examples, fuel flow through each of the pre-mixed and non-premixed fuel streams and/or airflow through the injector passage 88 during the first mode differs from the second mode. For example, during the second (e.g., high power) mode, less than about 15 percent of the total fuel is delivered to primary fuel injector 76 of the pilot fuel injector assembly 70 to form a stable non-premixed pilot flame and about 85 percent or greater of the total fuel is delivered to the secondary plain-jet fuel injectors 78 of pilot fuel injector assembly 70 to form a premixed main flame having reduced NOx and smoke emissions. At block 95, the products of combustion from the injector passage 88 are communicated to downstream portions of the combustion chamber 62 during each of the first and second modes, which is then delivered downstream to turbine section 28. In some examples, at block 96 fuel from the main fuel injector assembly 64 is injected into the combustion chamber 62 at a location downstream of the injector passage 88 to establish a main flame during the second mode, but not the first mode. About 60-85 percent of the total fuel is delivered to the main fuel injector assembly 64 and about 15-40 percent is delivered to the pilot fuel injector assembly 70 during the second mode, and about 100 percent of the total fuel is delivered to the pilot fuel injector assembly 70 during the first mode, for example. In one example, about 75 percent of the fuel is delivered to the main fuel injector assembly 64, and about 25 percent of fuel is delivered to the pilot fuel injector assembly 70 during the second mode.

Generation of a pilot flame including portions formed by premixed and non-premixed flames can reduce NOx and smoke emissions during high power conditions of the engine 20. This decrease in NOx and smoke emissions relates to a geometry of the injector passage 88 and/or a relative fuel split of the primary fuel injector 76 and plain-jet fuel injectors 78. This decrease in NOx and smoke emissions is also based on relatively more uniform and increased mixing of the fuel and air to produce a relatively leaner uniform fuel/air mixture, as compared to generation of a non-premixed flame alone. Generation of a single, combined non-premixed flame provides a relatively stable pilot flame during low power conditions of the engine 20.

Figure 8:
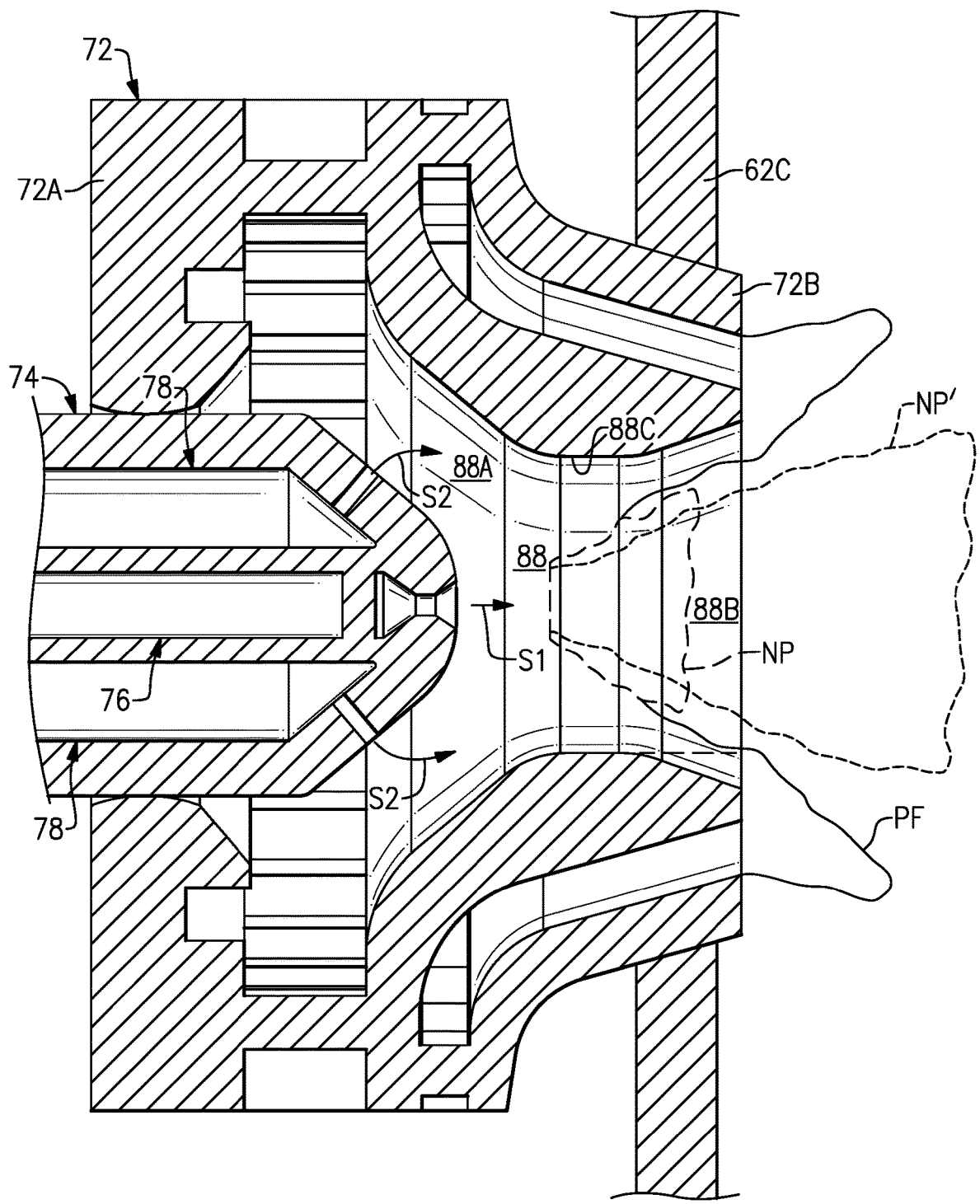
FIG. 8 illustrates various flame geometries associated with the combustor assembly of FIG. 2.

An example geometry of a premixed flame PF and a non-premixed flame NP during high power conditions is illustrated by FIG. 8. During high power conditions of the engine 20, the premixed flame PF has a generally annular, outward sloping profile that extends about the non-premixed flame NP having a generally conical profile. The divergent profile of the second passage section 88B of the injector passage 88 causes portions of the non-premixed flame NP to be situated axially forward of the passage outlet 88D of the injector passage 88 (i.e., approaches a stoichiometric point of 1.0), which can increase stability of the non-premixed flame NP. During a low power condition of the engine 20, a single non-premixed flame NP' extends relative further aftward into the combustion chamber 62, which can be utilized to ignite fuel injected by the main fuel injector assembly 64 when transitioning to a high power condition of the engine 20. The relatively lower amount of soot produced during high power conditions can be substantially consumed mainly by the large main flame prior to exiting the combustion chamber 62, thereby further reducing smoke emission.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

What is claimed is:

1. A combustor assembly for a gas turbine engine comprising:
    a combustion chamber; and
    a fuel injector assembly in communication with the combustion chamber, the fuel injector assembly comprising:
        a nozzle including a nozzle body, a primary fuel injector along a nozzle longitudinal axis, and an array of secondary plain jet fuel injectors axially forward of the primary fuel injector relative to the nozzle longitudinal axis; and
        a swirler body situated about the nozzle to define an injector passage that converges to a throat, the throat defined at a distance from the combustion chamber relative to the nozzle longitudinal axis;
        wherein the nozzle body extends along the nozzle longitudinal axis between a first end portion and a second end portion, a periphery of nozzle body along the second end portion is established by an annular wall that tapers inwardly to a terminal end of the nozzle body, and the nozzle longitudinal axis extends through a primary outlet of the primary fuel injector along the second end portion;
        wherein the injector passage includes a first passage section merging into a second passage section, the first passage section is an inward sloping annulus defined between the swirler body and the nozzle, the second passage section interconnects the first passage section and the combustion chamber, and the second passage section defines the throat;

wherein the periphery of the second end portion defines a radially inner wall of the first passage section, and the radially inner wall opposes a radially outer wall of the first passage section established by the swirler body;

wherein outlets of the secondary plain jet fuel injectors are circumferentially distributed about the annular wall along the first passage section such that the outlets are spaced apart from the terminal end of the nozzle body relative to the nozzle longitudinal axis, and each of the secondary plain jet fuel injectors defines a second fuel injector axis extending through the respective outlet such that a projection of the second fuel injector axis intersects the radially outer wall of the injector passage along the first passage section; and wherein the radially inner wall tapers into an axial face that establishes the terminal end of the nozzle body, and the primary outlet of the primary fuel injector is established along the axial face.

2. The combustor assembly as recited in claim 1, further comprising:

a control that meters flow of fuel to the primary fuel injector and flow of fuel to the secondary plain-jet fuel injectors in a first mode, and meters flow of fuel to the primary fuel injector and to the secondary plain-jet fuel injectors in a second, different mode such that a rate of the flow of fuel to the primary fuel injector and the secondary plain-jet fuel injectors differs from the first mode.

3. The combustor assembly as recited in claim 2, wherein the primary fuel injector is arranged to generate a non-premixed fuel stream, and the secondary plain-jet fuel injectors are arranged to generate a substantially premixed fuel stream.

4. The combustor assembly as recited in claim 1, wherein the injector passage defines a first passage area with respect to a first reference plane that is perpendicular to the nozzle longitudinal injector axis and intersects the outlet of a forwardmost one of the secondary plain-jet fuel injectors, the injector passage defines a second passage area with respect to a second reference plane along the throat that is perpendicular to the nozzle longitudinal axis, and a ratio of the first passage area to the second passage area being 1.2 to 1.5.

5. The combustor assembly as recited in claim 4, wherein the injector passage diverges aft of the throat with respect to the nozzle longitudinal axis.

6. The combustor assembly as recited in claim 1, wherein the outlet of a forwardmost one of the secondary plain-jet fuel injectors and the throat define a first distance with respect to the nozzle longitudinal axis, the outlet of the primary fuel injector and the throat defines a second distance with respect to the nozzle longitudinal axis, and a ratio of the first distance to the second distance being between 2.0 to 4.0.

7. A gas turbine engine comprising:

a fan section including a plurality of fan blades rotatable about an engine axis;

a compressor section in fluid communication with the fan section;

a turbine section driving the fan section; and a combustor section in fluid communication with the compressor section and the turbine section, the combustor section comprising:

a combustion chamber extending from a bulkhead;

a fuel injector assembly along the bulkhead, the fuel injector assembly including a nozzle and a swirler body, the nozzle including a nozzle body extending along a nozzle longitudinal axis between a first end portion and a second end portion, the nozzle including a primary fuel injector along the nozzle longitudinal axis and an array of secondary plain-jet fuel injectors arranged about a periphery of the nozzle body, the nozzle longitudinal axis extending through a primary outlet of the primary fuel injector along the second end portion, and the swirler body situated about the nozzle body to define an injector passage that converges to a throat such that flow through the injector passage accelerates towards the throat;

wherein the injector passage includes a first passage section merging into a second passage section, the first passage section defined between the swirler body and the nozzle, the second passage section defining the throat, a radially outer wall of the first passage section slopes toward the nozzle longitudinal axis, and a radially inner wall of the first passage section along the nozzle body slopes toward the nozzle longitudinal axis;

wherein outlets of the secondary plain jet fuel injectors are circumferentially distributed about a periphery of the nozzle body along the radially inner wall of the first passage section such that the outlets are spaced apart from a terminal end of the nozzle body relative to the nozzle longitudinal axis, and each secondary plain jet defines a second fuel injector axis extending through the respective outlet such that a projection of the second fuel injector axis intersects the radially outer wall of the injector passage along the first passage section; and wherein the radially inner wall tapers into an axial face that establishes the terminal end of the nozzle body, and the primary outlet of the primary fuel injector is established along the axial face.

8. The gas turbine engine as recited in claim 7, wherein the throat is defined at a position axially forward of the combustion chamber relative to the nozzle longitudinal axis.

9. The gas turbine engine as recited in claim 8, wherein the first passage section being an annulus defined between the swirler body and the nozzle body, the first passage section extending from an array of vanes that provide airflow to the first passage section, and the second passage section defining the throat at a position axially aft of the primary fuel injector relative to the nozzle longitudinal axis.

10. The gas turbine engine as recited in claim 7, further comprising:

a controller that meters flow of fuel to the primary fuel injector and flow of fuel to the array of secondary plain-jet fuel injector in a first operating condition of the engine, and meters flow of fuel to the primary fuel injector and to the array of secondary plain-jet fuel injectors in a second, different operating condition of the engine such that a rate of the flow of fuel to the primary fuel injector and the array of secondary plain-jet fuel injectors differs from the first operating condition.

11. The gas turbine engine as recited in claim 10, further comprising:

a main fuel injector radially disposed about the combustion chamber at a location axially aft of the bulkhead relative to the nozzle longitudinal axis;

wherein the controller permits flow to the main fuel injector in the second operating condition but not the first operating condition; and wherein the first operating condition is a low power operating condition of the engine, and the second operating condition is a relatively higher power operating condition of the engine.

12. The gas turbine engine as recited in claim 10, wherein the throat is defined at a position axially forward of the combustion chamber relative to the nozzle longitudinal axis, the first passage section is an annulus defined between the swirler body and the nozzle body, and the second passage section defines the throat at a position axially aft of the primary fuel injector relative to the nozzle longitudinal axis.

13. The gas turbine engine as recited in claim 12, further comprising:

a main fuel injector radially disposed about the combustion chamber at a location axially aft of the bulkhead relative to the nozzle longitudinal axis;

wherein the controller permits flow to the main fuel injector in the second operating condition but not the first operating condition; and wherein the first operating condition is a low power operating condition of the engine, and the second operating condition is a relatively higher power operating condition of the engine.

14. The gas turbine engine as recited in claim 13, wherein the injector passage defines a first passage area with respect to a first reference plane that is perpendicular to the nozzle longitudinal axis and intersects the outlet of a forwardmost one of the secondary plain-jet fuel injectors, the injector passage defines a second passage area with respect to a second reference plane along the throat that is perpendicular to the nozzle longitudinal axis, and a ratio of the first passage area to the second passage area being 1.2 to 1.5.

15. The combustor assembly as recited in claim 14, wherein the outlet of a forwardmost one of the secondary plain-jet fuel injectors and the throat define a first distance with respect to the nozzle longitudinal axis, the outlet of the primary fuel injector and the throat defines a second distance with respect to the nozzle longitudinal axis, and a ratio of the first distance to the second distance being between 2.0 to 4.0.

16. A method of operating a combustor assembly for a gas turbine engine comprising:

accelerating airflow in an injector passage from a first passage section of the injector passage toward a throat defined by a second passage section of the first passage section;

injecting fuel into the first passage section by a primary outlet of a primary fuel injector and fuel into the second passage section by secondary outlets of an array of secondary plain jet fuel injectors to establish a single non-premixed flame during a first, different mode; and injecting fuel into the first passage section to establish a non-premixed flame and fuel into the second passage section to establish a premixed flame during a second mode;

wherein a swirler body is situated about a nozzle to define the injector passage, the nozzle includes a nozzle body extending along a nozzle longitudinal axis between a first end portion and a second end portion, and the second end portion includes a periphery established by an annular wall that tapers inwardly to a terminal end of the nozzle body;

wherein the secondary outlets are circumferentially distributed about the annular wall along the first passage section such that the secondary outlets are spaced apart from the terminal end of the nozzle body relative to the nozzle longitudinal axis, and each of the secondary plain jet fuel injectors defines a second fuel injector axis extending through the respective secondary outlet such that a projection of the second fuel injector axis intersects a radially outer wall of the injector passage along the first passage section; and wherein a radially inner wall of the first passage section along the nozzle body tapers into an axial face that establishes the terminal end of the nozzle body, and the primary outlet of the primary fuel injector is established along the axial face.

17. The method as recited in claim 16, further comprising:

injecting fuel into a combustion chamber at a location downstream of the injector passage to establish a main flame during the second mode, but not the first mode.

18. The method as recited in claim 17, wherein the first mode corresponds to low power operating condition of the engine, and the second mode corresponds to higher power operating condition of the engine.

19. The method as recited in claim 16, wherein:

the injector passage defines a first passage area with respect to a first reference plane that is perpendicular to the nozzle longitudinal axis and intersects the secondary outlet of a forwardmost one of the secondary plain-jet fuel injectors, the injector passage defines a second passage area with respect to a second reference plane along the throat that is perpendicular to the nozzle longitudinal axis, and a ratio of the first passage area to the second passage area being 1.2 to 1.5; and the secondary outlet of a forwardmost one of the secondary plain-jet fuel injectors and the throat define a first distance with respect to the nozzle longitudinal axis, the primary outlet of the primary fuel injector and the throat defines a second distance with respect to the nozzle longitudinal axis, and a ratio of the first distance to the second distance being between 2.0 to 4.0.

* * * * *